(12) United States Patent
Strother

(10) Patent No.: US 8,701,286 B2
(45) Date of Patent: Apr. 22, 2014

(54) ROTATIONALLY BALANCING A ROTATING PART

(75) Inventor: Oliver M. Strother, Leeds (GB)

(73) Assignee: Rolls-Royce PLC, London (GB)

( * ) Notice: Subject to any disclaimer, the term of this patent is extended or adjusted under 35 U.S.C. 154(b) by 432 days.

(21) Appl. No.: 13/114,382

(22) Filed: May 24, 2011

(65) Prior Publication Data
US 2011/0296686 A1   Dec. 8, 2011

(30) Foreign Application Priority Data
Jun. 2, 2010   (GB) .................................. 1009216.1

(51) Int. Cl.
*B21K 25/00* (2006.01)
*B23K 15/04* (2006.01)
*B63H 1/26* (2006.01)

(52) U.S. Cl.
USPC ..................... 29/889.21; 29/889.23; 416/232; 416/500

(58) Field of Classification Search
USPC ......... 29/889.2, 889.21, 889.3; 416/190, 232, 416/500
See application file for complete search history.

(56) References Cited

U.S. PATENT DOCUMENTS

| | | | |
|---|---|---|---|
| 2,202,014 A | 5/1940 | Lougheed | |
| 3,111,747 A | 11/1963 | Johnson | |
| 3,736,638 A | 6/1973 | Stone, Jr. | |
| 3,927,817 A | 12/1975 | Hamilton et al. | |
| 4,217,397 A | 8/1980 | Hayase et al. | |
| 4,292,375 A | 9/1981 | Ko | |
| 4,304,821 A | 12/1981 | Hayase et al. | |
| 4,331,284 A | 5/1982 | Schulz et al. | |
| 4,460,314 A * | 7/1984 | Fuller .......................... | 416/145 |
| 4,522,860 A | 6/1985 | Scott et al. | |
| 4,530,197 A | 7/1985 | Rainville | |
| 4,583,914 A | 4/1986 | Craig et al. | |
| 4,642,863 A | 2/1987 | Schulz | |
| 4,655,014 A | 4/1987 | Krecke | |
| 4,811,890 A | 3/1989 | Dowling et al. | |
| 4,882,823 A | 11/1989 | Weisert et al. | |
| 5,007,225 A | 4/1991 | Teasdale | |
| 5,119,531 A | 6/1992 | Berger et al. | |

(Continued)

FOREIGN PATENT DOCUMENTS

| EP | 0 130 583 A2 | 1/1985 |
|---|---|---|
| EP | 0 181 203 A2 | 5/1986 |

(Continued)

OTHER PUBLICATIONS

Feb. 21, 2013 Office Action issued in U.S. Appl. No. 12/216,505.

(Continued)

*Primary Examiner* — David Bryant
*Assistant Examiner* — Jason L Vaughan
(74) *Attorney, Agent, or Firm* — Oliff PLC

(57) ABSTRACT

A method is provided of rotationally balancing a rotating part. A rotor hub or ring and a plurality of rotor blades for assembly onto the hub or ring are provided, each blade having an unfilled internal cavity. The respective masses and moment weights of the blades with filled internal cavities are then predicted. Next, the rotor blades are assembled onto the hub or ring to form the rotating part. The relative positions of the assembled blades are determined on the basis of their predicted masses and moment weights with filled internal cavities. The internal cavities of the assembled rotor blades are then filled.

8 Claims, 1 Drawing Sheet

(56) References Cited

U.S. PATENT DOCUMENTS

| | | | |
|---|---|---|---|
| 5,143,276 A | 9/1992 | Mansbridge et al. | |
| 5,240,376 A | 8/1993 | Velicki | |
| 5,243,758 A | 9/1993 | LeMonds et al. | |
| 5,253,419 A | 10/1993 | Collot et al. | |
| 5,323,953 A | 6/1994 | Adderley et al. | |
| 5,330,092 A | 7/1994 | Gregg et al. | |
| 5,384,959 A | 1/1995 | Velicki | |
| 5,419,039 A | 5/1995 | Auxier et al. | |
| 5,469,618 A | 11/1995 | LeMonds et al. | |
| 5,534,354 A | 7/1996 | Gregg et al. | |
| 5,537,861 A * | 7/1996 | Seitelman et al. | 73/66 |
| 5,544,805 A | 8/1996 | Alassoeur et al. | |
| 5,570,552 A | 11/1996 | Nehring | |
| 5,692,881 A | 12/1997 | Leibrfied | |
| 5,723,225 A | 3/1998 | Yasui et al. | |
| 5,821,506 A | 10/1998 | Matsen | |
| 5,826,332 A | 10/1998 | Bichon et al. | |
| 5,881,459 A | 3/1999 | Yasui | |
| 5,941,446 A | 8/1999 | Yasui | |
| 6,039,542 A | 3/2000 | Schilling et al. | |
| 6,139,278 A | 10/2000 | Mowbray et al. | |
| 6,224,341 B1 | 5/2001 | Fricke | |
| 6,287,080 B1 * | 9/2001 | Evans et al. | 416/229 A |
| 6,331,217 B1 | 12/2001 | Burke et al. | |
| 6,419,146 B1 | 7/2002 | Buldhaupt et al. | |
| 6,467,168 B2 | 10/2002 | Wallis | |
| 6,669,447 B2 | 12/2003 | Norris et al. | |
| 6,720,087 B2 | 4/2004 | Fried et al. | |
| 6,893,211 B1 | 5/2005 | Eibl et al. | |
| 6,908,285 B2 * | 6/2005 | Henning et al. | 416/144 |
| 6,979,180 B2 | 12/2005 | Motherwell | |
| 7,025,568 B2 | 4/2006 | Jones | |
| 7,070,390 B2 | 7/2006 | Powell | |
| 7,090,464 B2 * | 8/2006 | Henning et al. | 416/61 |
| 7,144,222 B2 | 12/2006 | Lanni et al. | |
| 7,247,003 B2 | 7/2007 | Burke et al. | |
| 7,287,958 B2 * | 10/2007 | Henning et al. | 416/61 |
| 7,311,500 B2 | 12/2007 | Rongong et al. | |
| 7,406,849 B2 | 8/2008 | Ueno et al. | |
| 7,431,197 B2 | 10/2008 | Franchet et al. | |
| 7,470,114 B2 | 12/2008 | Bonnet | |
| 7,572,101 B2 * | 8/2009 | Mickol et al. | 416/1 |
| 7,739,072 B2 * | 6/2010 | DeBlois et al. | 702/127 |
| 7,753,654 B2 * | 7/2010 | Read et al. | 416/229 R |
| 7,979,233 B2 * | 7/2011 | DeBlois et al. | 702/127 |
| 8,180,596 B2 * | 5/2012 | Henning et al. | 703/1 |
| 8,186,057 B2 * | 5/2012 | Harrison et al. | 29/889.23 |
| 8,382,441 B2 | 2/2013 | Brennand et al. | |
| 2002/0014101 A1 | 2/2002 | Yajima | |
| 2003/0136815 A1 | 7/2003 | Debaisieux et al. | |
| 2003/0156942 A1 | 8/2003 | Villhard | |
| 2003/0164255 A1 | 9/2003 | Borroni-Bird et al. | |
| 2004/0013523 A1 * | 1/2004 | Berger et al. | 416/1 |
| 2004/0018091 A1 | 1/2004 | Rongong et al. | |
| 2004/0191069 A1 | 9/2004 | Motherwell | |
| 2006/0066133 A1 | 3/2006 | Ueno et al. | |
| 2006/0255098 A1 | 11/2006 | Runyan | |
| 2007/0065291 A1 | 3/2007 | Karafillis | |
| 2007/0243070 A1 | 10/2007 | Matheny | |
| 2007/0243408 A1 | 10/2007 | Straza | |
| 2008/0025846 A1 | 1/2008 | Vance et al. | |
| 2008/0260538 A1 | 10/2008 | Wilson et al. | |
| 2009/0057488 A1 | 3/2009 | Goldfinch et al. | |
| 2009/0057489 A1 | 3/2009 | Goldfinch et al. | |
| 2009/0057718 A1 | 3/2009 | Suvorov et al. | |
| 2009/0060718 A1 | 3/2009 | Goldfinch et al. | |
| 2009/0304517 A1 | 12/2009 | Strother | |
| 2010/0021693 A1 | 1/2010 | Goldfinch et al. | |
| 2010/0040479 A1 | 2/2010 | Spangler et al. | |
| 2010/0186215 A1 | 7/2010 | Jones et al. | |

FOREIGN PATENT DOCUMENTS

| | | |
|---|---|---|
| EP | 0 209 867 A2 | 1/1987 |
| EP | 0 358 523 A1 | 3/1990 |
| EP | 0 418 179 A1 | 3/1991 |
| EP | 0 469 221 A1 | 2/1992 |
| EP | 0 354 631 B1 | 6/1992 |
| EP | 0 500 458 A1 | 8/1992 |
| EP | 0 520 827 A2 | 12/1992 |
| EP | 0 527 564 A1 | 2/1993 |
| EP | 0 549 172 A1 | 6/1993 |
| EP | 0 555 534 A2 | 8/1993 |
| EP | 0 582 795 A1 | 2/1994 |
| EP | 0 594 885 A1 | 5/1994 |
| EP | 0 765 711 A1 | 4/1997 |
| EP | 0 716 273 B1 | 3/1998 |
| EP | 0 926 312 A2 | 6/1999 |
| EP | 1 013 355 A2 | 6/2000 |
| EP | 1 085 288 A1 | 3/2001 |
| EP | 0 594 886 B1 | 7/2001 |
| EP | 1 160 752 A1 | 12/2001 |
| EP | 1 184 768 A2 | 3/2002 |
| EP | 1 024 330 B1 | 11/2002 |
| EP | 0 886 813 B1 | 1/2003 |
| EP | 1 327 489 A1 | 7/2003 |
| EP | 1 355 212 A1 | 10/2003 |
| EP | 1 433 993 A1 | 6/2004 |
| EP | 1 460 347 A1 | 9/2004 |
| EP | 1 460 507 A2 | 9/2004 |
| EP | 1 466 692 A1 | 10/2004 |
| EP | 1 491 980 A2 | 12/2004 |
| EP | 1 541 953 A1 | 6/2005 |
| EP | 1 561 901 A2 | 8/2005 |
| EP | 1 160 640 B1 | 2/2006 |
| EP | 1 653 165 A1 | 5/2006 |
| EP | 1 811 129 A2 | 7/2007 |
| EP | 2 014 384 A1 | 1/2009 |
| EP | 2 014 386 A1 | 1/2009 |
| EP | 2 014 387 A1 | 1/2009 |
| EP | 2 014 388 A1 | 1/2009 |
| EP | 2119871 A2 | 11/2009 |
| EP | 2 147 731 | 1/2010 |
| EP | 2 223 766 A1 | 9/2010 |
| GB | 842937 A | 7/1960 |
| GB | 1 367 958 A | 9/1974 |
| GB | 1 437 510 A | 5/1976 |
| GB | 2 124 520 A | 2/1984 |
| GB | 2 154 287 A | 9/1985 |
| GB | 1 284 867 A | 7/1987 |
| GB | 2 193 306 A | 2/1988 |
| GB | 2 198 264 A | 6/1988 |
| GB | 2 202 619 A | 9/1988 |
| GB | 2 206 685 A | 1/1989 |
| GB | 2 211 593 A | 7/1989 |
| GB | 2 228 069 A | 8/1990 |
| GB | 2 249 615 A | 5/1992 |
| GB | 2 251 063 A | 6/1992 |
| GB | 2 261 032 A | 5/1993 |
| GB | 2 298 265 A | 8/1996 |
| GB | 2 305 720 A | 4/1997 |
| GB | 2 360 070 A | 9/2001 |
| GB | 2 371 095 A | 7/2002 |
| GB | 2 387 669 A | 10/2003 |
| GB | 2 391 270 A | 2/2004 |
| GB | 2 393 498 A | 3/2004 |
| GB | 2 397 855 A | 8/2004 |
| GB | 2 401 407 A | 11/2004 |
| GB | 2 402 716 A | 12/2004 |
| GB | 2 408 295 A | 5/2005 |
| GB | 2 411 462 A | 8/2005 |
| GB | 2 416 228 A | 1/2006 |
| GB | 2 438 185 A | 11/2007 |
| GB | 2 014 869 A1 | 1/2009 |
| GB | 2 450 934 A | 1/2009 |
| GB | 2 450 935 A | 1/2009 |
| JP | A-2008-133825 | 6/2008 |
| WO | WO 97/27045 A2 | 7/1997 |
| WO | WO 00/70271 A1 | 11/2000 |
| WO | WO 01/56332 A1 | 8/2001 |

(56) References Cited

FOREIGN PATENT DOCUMENTS

| WO | WO 01/82018 A2 | 11/2001 |
|----|----|----|
| WO | WO 02/48615 A2 | 6/2002 |
| WO | WO 03/025469 A1 | 3/2003 |
| WO | WO 03/042607 A1 | 5/2003 |
| WO | WO 03/093916 A2 | 11/2003 |
| WO | WO 2004/102077 A1 | 11/2004 |
| WO | WO 2005/022953 A1 | 3/2005 |
| WO | WO 2005/045326 A1 | 5/2005 |
| WO | WO 2005/067619 A2 | 7/2005 |
| WO | WO 2005/069820 A2 | 8/2005 |
| WO | WO 2005/071510 A1 | 8/2005 |

OTHER PUBLICATIONS

Apr. 16, 2012 Office Action issued in U.S. Appl. No. 12/216,502.
Search Report issued in British Application No. GB1009216.1 dated Sep. 2, 2010.
Sep. 16, 2013 European Search Report issued in European Patent Application No. EP 10 17 0940.
Sep. 2, 2009 European Search Report issued in European Application No. 09 25 1341.
Dec. 14, 2010 Search Report issued in British Application No. GB1020063.2.
Jul. 28, 2009 Search Report issued in British Patent Application No. 0907004.6.
Jul. 27, 2010 Search Report issued in European Patent Application No. EP 10 15 7495.2.
Jan. 19, 2010 Search Report issued in British Patent Application No. 0916687.7.
May 19, 2010 European Search Report issued in related European Patent Application No. 09252779.5 (with Abstract).
May 5, 2009 British Search Report issued in related British Patent Application No. GB0901235.2.
Mar. 18, 2009 British Search Report issued in British Patent Application No. GB0901318.6.
Oct. 7, 2008 European Search Report issued in European Patent Application No. 08 01 1077.
Oct. 20, 2008 European Search Report issued in European Patent Application No. 08 01 1078.
Oct. 21, 2008 European Search Report issued in European Patent Application No. 08 01 1079.
Dec. 7, 2010 Search Report issued in British Application No. GB1013305.6.
Sep. 15, 2009 Search Report issued in British Application No. GB0911416.6.
May 11, 2011 Partial European Search Report issued in European Application No. 10 16 5255.
Sep. 22, 2008 Search Report issued in British Application No. GB0808840.3.
Aug. 28, 2007 Search Report issued in British Application No. GB0713700.3.
Sep. 16, 2008 Search Report issued in British Application No. GB0813539.4.
Mar. 7, 2008 Search Report issued in British Application No. GB0713699.7.
Oct. 12, 2007 Search Report issued in British Application No. GB0713699.7.
Jul. 26, 2011 Office Action issued in U.S. Appl. No. 12/453,762.
Sep. 12, 2011 Office Action issued in U.S. Appl. No. 12/453,762.
Dec. 21, 2011 Notice of Allowance issued in U.S. Appl. No. 12/453,762.
Jul. 1, 2011 Office Action issued in U.S. Appl. No. 12/216,503.
Dec. 27, 2011 Notice of Allowance issued in U.S. Appl. No. 12/216,503.
Sep. 26, 2011 Office Action issued in U.S. Appl. No. 12/453,435.
Feb. 25, 2011 Office Action issued in U.S. Appl. No. 12/216,505.
Jun. 2, 2011 Office Action issued in U.S. Appl. No. 12/216,505.
Nov. 23, 2011 Office Action issued in U.S. Appl. No. 12/216,505.
Feb. 3, 2011 Office Action issued in U.S. Appl. No. 12/216,497.
Jul. 20, 2011 Office Action issued in U.S. Appl. No. 12/216,497.
Mar. 9, 2011 Notice of Allowance issued in U.S. Appl. No. 12/216,502.
Dec. 6, 2010 Office Action issued in U.S. Appl. No. 12/216,502.
U.S. Appl. No. 13/299,671 in the name of Strother, filed Nov. 18, 2011.
U.S. Appl. No. 12/654,504 in the name of Jones et al., filed Dec. 22, 2009.
U.S. Appl. No. 12/645,211 in the name of Strother, filed Dec. 14, 2009.
U.S. Appl. No. 12/844,215 in the name of Harron, filed Jul. 27, 2010.
U.S. Appl. No. 12/730,641 in the name of Strother, filed Mar. 24, 2010.
U.S. Appl. No. 12/216,503 in the name of Goldfinch et al, filed Jul. 7, 2008.
U.S. Appl. No. 13/186,850 in the name of Goldfinch et al, filed Jul. 20, 2011.
U.S. Appl. No. 12/453,762 in the name of Goldfinch, filed May 21, 2009.
U.S. Appl. No. 12/216,505 in the name of Strother, filed Jul. 7, 2008.
U.S. Appl. No. 12/453,435 in the name of Strother, filed May 11, 2009.
U.S. Appl. No. 12/796,231 in the name of Mason, filed Jun. 8, 2010.
U.S. Appl. No. 13/008,323 in the name of Strother, filed Jan. 18, 2011.
U.S. Appl. No. 12/720,253 in the name of Strother, filed Mar. 9, 2010.
U.S. Appl. No. 12/720,351 in the name of Strother, filed Mar. 9, 2010.
U.S. Appl. No. 12/216,502 in the name of Goldfinch et al., filed Jul. 7, 2008.
U.S. Appl. No. 12/216,497 in the name of Goldfinch et al., filed Jul. 7, 2008.
Jun. 29, 2012 Office Action issued in U.S. Appl. No. 12/654,504.
Jan. 17, 2013 Office Action issued in U.S. Appl. No. 12/654,211.
Mar. 7, 2012 Office Action issued in U.S. Appl. No. 12/453,435.
Jun. 20, 2013 Office Action issued in U.S. Appl. No. 12/730,641.
Jul. 9, 2013 Notice of Allowance issued in U.S. Appl. No. 12/453,762.
Aug. 21, 2013 Office Action issued in U.S. Appl. No. 12/796,231.
Sep. 3, 2013 Office Action issued in U.S. Appl. No. 12/654,211.
Sep. 6, 2012 Office Action issued in U.S. Appl. No. 12/216,505.
Mar. 12, 2012 Notice of Allowance issued in U.S. Appl. No. 12/216,503.
Mar. 20, 2012 Office Action issued in U.S. Appl. No. 12/216,505.
Oct. 10, 2013 Office Action issued in U.S. Appl. No. 12/216,505.
Dec. 6, 2013 Search Report issued in European Patent Application No. Ep 11 17 4688.
Dec. 2, 2013 Office Action issued in U.S. Appl. No. 12/730,641.
Feb. 10, 2014 Office Action issued in U.S. Appl. No. 13/186,850.

* cited by examiner

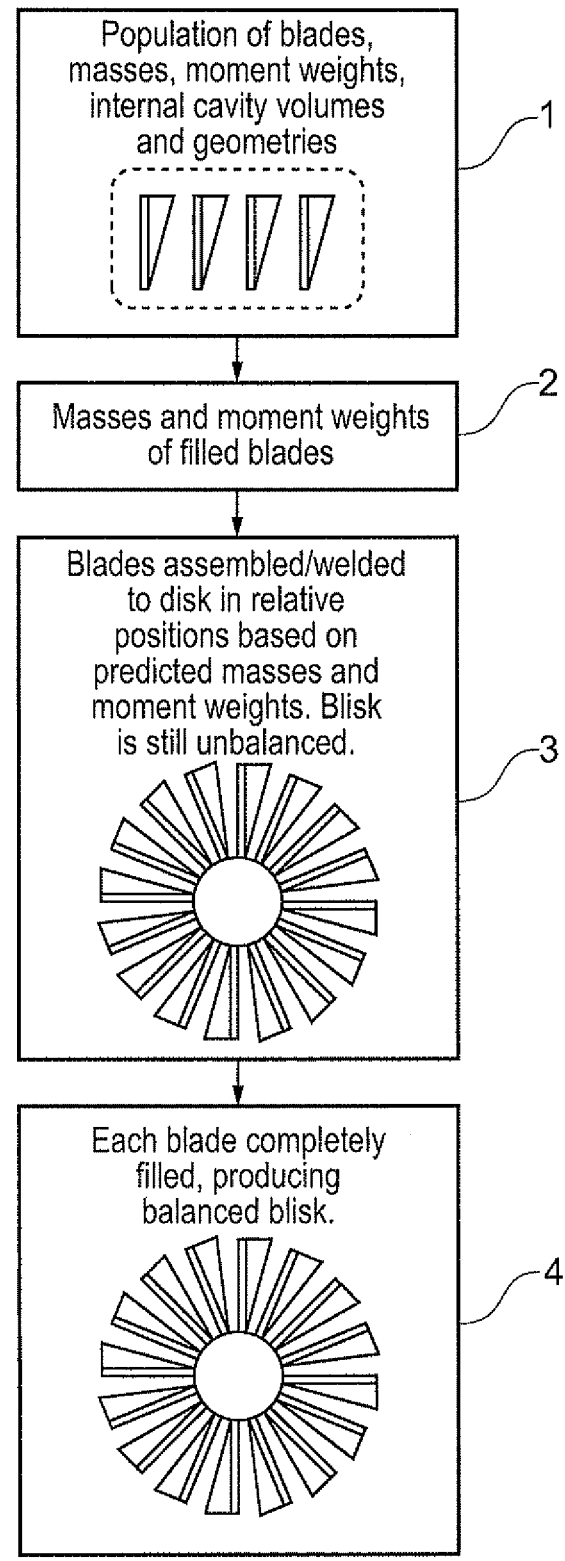

ROTATIONALLY BALANCING A ROTATING PART

The present invention relates to a method of rotationally balancing a rotating part.

Components that rotate at high speed must be balanced if undesirable vibration and associated stresses are to be avoided or reduced. This is particularly the case for rotors of gas turbine engines.

Bladed discs are commonly assembled by fitting removable and replaceable blades to a central rotor disc. It is then possible to balance the assembled discs by using the mass variation between individual blades, so that the positions of individual blades can be changed to eliminate any out-of-balance that occurs.

However, with integral bladed discs (known as "blisks") and with integral bladed rings (known as "blings"), it is not possible to exchange individual blades, is and so a different balancing method is required.

A rotating out-of-balance can take two forms. The first is static unbalance in which the centre of mass lies away from the rotational axis so that, if the rotor is supported in a frictionless manner, it will always come to rest in a position in which the centre of mass lies directly below the axis. A known method of correcting static unbalance is either to add an appropriate mass to the rotor at a position diametrically opposite the detected centre of mass, or to remove material from the same side of the axis as the centre of mass. The effect of such adjustments is to move the centre of mass to the rotational axis.

The second kind of rotating out-of-balance is dynamic unbalance which arises if out-of-balance forces are generated in different directions at different positions along the rotational axis of the rotor. Such forces give rise to a rotating couple unbalance when the rotor is rotated, and this can cause problems even if the rotor is in static balance. The rotating couple unbalance can be determined from the "moment weights" of the blades (blade moment weight=blade mass× distance from rotation axis). As with static unbalance, it is known to correct couple unbalance by the addition or removal of material from the rotor.

However, in both cases correcting unbalance involves a weight penalty, either from the direct effect of adding a balancing mass, or because the removal of material means that balancing lands need to be provided from which controlled material removal can be effected, and these balancing lands add to the weight of the component as a whole. Nonetheless, with hollow-bladed blisks or blings any necessary balancing adjustments are generally relatively small as the relatively low mass of the hollow blades tends to avoid significant out-of-balance problems, and thus the weight penalty may not be too onerous.

A problem can arise, however, if the mass of the blades is increased. In this case, out-of-balance problems can be more significant, and the weight penalty can be greater.

The present invention is at least partly based on the realisation that a rotating part with heavier blades can benefit from an alternative approach to rotational balancing.

Accordingly, the present invention provides a method of rotationally balancing a rotating part, the method comprising the steps of:

providing a rotor hub or ring and a plurality of rotor blades for assembly onto the hub or ring, each blade having an unfilled internal cavity;

predicting the respective masses and moment weights of the blades with filled internal cavities;

assembling the rotor blades onto the hub or ring to form the rotating part, the relative positions of the assembled blades being determined on the basis of their predicted masses and moment weights with filled internal cavities; and filling the internal cavities of the assembled rotor blades.

Advantageously, by determining the relative positions of the blades on the hub or ring using the predicted masses and moment weights, the resulting rotating part may be substantially balanced after the assembly and filling steps. It may then be possible to reduce the number and/or size of balancing lands, or avoid providing balancing lands at all. This can lead to weight and cost savings. Further, the pre-assembly predicting step can take less time and/or be less costly than conventional post-assembly balancing operations.

The methods may have any one or, to the extent that they are compatible, any combination of the following optional features.

The rotating part may be a blisk, the rotor blades being assembled onto a rotor hub in the form of a disk to form the blisk. Alternatively, the rotating part may be a bling, the rotor blades being assembled onto a rotor ring to form the bling. The blisk or bling can be for use in a gas turbine engine. Other possible rotating parts to which the method may be applied are: a helicopter rotor hub and blades, a wind turbine rotor hub and blades, a turbo-prop rotor hub and propeller blades, and a ship rotor hub and propeller blades.

Typically, the methods further comprise the step, between the providing and predicting steps, of determining (e.g. measuring) the masses and moment weights of the blades with unfilled internal cavities and the respective volumes of their internal cavities, the subsequent prediction of the respective masses and moment weights of the blades with filled internal cavities being based on the determined masses, moment weights and volumes.

The volumes of the internal cavities of the blades can be conveniently determined by gas pressure analysis, CT (Computerised, typically X-ray, Tomography) scanning or ultrasonic CMM (Coordinate Measuring Machine) inspection.

The shapes (i.e. the geometries) of the internal cavities of the blades may already be known with sufficient accuracy to allow the moment weights of the filled blades to be predicted without specifically determining the internal cavity shapes. However, the determining step may also include determining the respective shapes of the internal cavities. The respective masses and moment weights of the blades with filled internal cavities can then be predicted on the basis of the determined masses, moment weights, volumes and shapes. For example, the shapes of the internal cavities can be determined by CT scanning or ultrasonic CMM inspection. This is particularly convenient if CT scanning or ultrasonic CMM inspection is anyway used to determine the volumes of the internal cavities of the blades.

Blisks and Wings in particular can be susceptible to vibration as the natural damping of the dovetail attachment, of e.g. a conventional removable and replaceable compressor blade, is not present. Thus, advantageously, the internal cavities can be filled with vibration damping material. For example, the vibration damping material can be a viscoelastic damping material. However, other rotating parts to which the method can be applied may also benefit from having the internal cavities being filled with vibration damping material.

Embodiments of the invention will now be described by way of example with reference to the accompanying drawing in which:

FIG. 1 is a flow chart which illustrates stages in the manufacture of a blisk.

Hollow aerofoils are commonly used on civil fan blades, and may in future be used as the blades of compressor section blisks. Typically the blade cavity is formed during the manufacturing process of the blade by vacuum drawing. A rigid internal metallic structure may be included in the cavity to increase strength and stiffness, and stop the panels "panting".

In order to increase damping, and hence reduce vibration on fan blades, a concept has been demonstrated where the hollow cavity of a fan blade is filled with damping material. For example, GB2450937 discloses a fan blade having a cavity into which is introduced a viscoelastic filler to adjust the frequency response of the blade.

Blisks and blings can be particularly susceptible to vibration as the natural damping of the dovetail attachment, of e.g. a conventional removable and replaceable compressor blade, is not present. Thus it can be beneficial to extend the viscoelastic filler damping concept to the hollow blades of blisks and blings.

However, when blades are assembled (e.g. welded) onto a disc/ring to form a blisk/bling, their radial position can vary, which can have an effect on the rotational balance of the blisk/bling. This is not generally a significant problem for unfilled blisks/blings as typically the majority of the space occupied by each blade is cavity, and a small change in radial position has a little effect on balance. On the other hand, with viscoelastically damped filled blades, the out of balance generated from a change in blade radial position can be greater, as the blades will have an increased mass from the subsequent filling process, the position of the filled mass being at a significant radial distance from the axis of rotation.

Further, in the manufacture of blisks and blings, although the individual blades can be weighed and moment weighed prior to being assembled (e.g. welded) to the disc/ring, the filling of the internal cavities of the blades after assembly can lead to uncertain or variable amounts of filler material being located in the blades. This can also lead to significant disturbance of the static or dynamic rotational balance of the blisk/bling.

One approach for balancing the blisk/bling might be to incompletely fill some or all of the blades in order to achieve rotational balance. That is, the filler material can also serve as a balancing aid whose mass is effectively added or removed as required. However, this approach adds manufacturing costs in terms of process control and can result in reduced overall damping performance.

Thus, according to embodiments of the present invention, blinks or blings having filled (e.g. viscoelastically damped) hollow blades are balanced by determining the internal volumes of the blades, and preferably also the internal geometries of the hollow blades, prior to filling, and then selecting their positions in the assembled blisk/bling on the basis of the predicted masses and moment weights of the filled blades.

FIG. 1 is a flow chart which illustrates stages in such a procedure, as applied to the assembly of a blisk. Firstly a population of blades is provided 1, each blade having an internal cavity which will in due course be filled with a viscoelastic filler. The masses and moment weights of the blades are measured using techniques conventional in the art. The internal volumes, and preferably the internal geometries, of the blades are measured using techniques discussed below. Next, using the measured masses, moment weights, internal volumes and preferably the internal geometries, the masses and moment weights of the filled blades are predicted 2. These predictions are used to select relative positions of the blades on the disk which will reduce or eliminate static and dynamic unbalance when the blades are filled. The blades are then assembled (e.g. welded) to the disk 3 in the selected positions. At this stage, the assembled blisk is still unbalanced. The final stage is then to fill the cavities of the blades with viscoelastic filler 4, resulting in a substantially balanced blisk. Further each blade is completely filled, which advantageously improves the overall damping performance. As the balancing work is performed prior to the filler injection, the injection process can be simplified. In particular, a simplified injection process with identical parameters for each blade can be used, which facilitates a streamlined manufacturing process.

The internal volume of each blade can be determined by gas pressure analysis. For example, a sealed known volume (V-1) of gas at a known pressure (P-1) can be released into the sealed cavity of the blade. The resulting volume (V-2) consists of (V-1) and the volume of the cavity (V-blade). A consequence of releasing the known volume of gas into the blade cavity is a drop in pressure to (P-2). Using the ideal gas laws, the relationship (P-1)/(P-2) can be used to calculate (V-blade).

Alternatively, the blade internal volume can be calculated using CT scanning data or ultrasonic CMM data. This approach may be desirable if CT scanning data or ultrasonic CMM inspection is anyway going to be used to measure the geometry of the blade cavity.

Advantages of the procedure may include:

Simplified filler injection process parameters.

As the blisk/bling is generally already substantially balanced after injection of the filler material, it may be unnecessary to add additional weights to correct out-of-balance.

For similar reasons, it may be possible to remove lands for balance correction, reducing the weight of the blisk/bling.

Reduction of component cost and lead-time by the avoidance of post-assembly balance correction machining.

Reduced mass moment weight scatter for fan blades, providing significant logistics benefits.

While the invention has been described in conjunction with the exemplary embodiments described above, many equivalent modifications and variations will be apparent to those skilled in the art when given this disclosure. For example, although the invention has been described in relation to the rotational balancing of blisks and blings, it may also be applied to other rotating parts, such as propeller assemblies, wind turbines, hollow propellers and low weight flywheels. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of manufacturing a rotationally balanced rotating part, the method comprising the steps of:
providing a rotor hub or rotor ring and a plurality of rotor blades for assembly onto the rotor hub or rotor ring, each blade having an internal cavity;
determining an initial mass, an initial moment weight and an internal cavity volume for each of the plurality of rotor blades;
predicting a final mass and a final moment weight of each of the plurality of rotor blades based on the determined initial mass, initial moment weight and internal cavity volume;
assembling the plurality of rotor blades onto the rotor hub or rotor ring to form the rotating part;

wherein the position of each of the plurality of rotor blades relative to the remaining plurality of rotor blades on the rotor hub or rotor ring is based on the predicted final mass and final moment weight of each of the plurality of rotor blades; and subsequently filling the internal cavity of each of the plurality of rotor blades after each of the plurality of rotor blades has been assembled onto the rotor hub or rotor ring to form the rotating part.

2. A method according to claim 1, wherein the rotating part is a blisk, the plurality of rotor blades being assembled onto the rotor hub; and wherein the rotor hub is provided in the form of a disk in order to form the blisk.

3. A method according to claim 1, wherein the rotating part is a bling, the plurality of rotor blades being assembled onto the rotor ring in order to form the bling.

4. A method according to claim 1, wherein the internal cavity volume of each of the plurality of rotor blades is determined by gas pressure analysis, CT scanning or ultrasonic CMM inspection.

5. A method according to claim 1, wherein the determining step includes determining the shape of the internal cavity of each of the plurality of rotor blades.

6. A method according to claim 5, wherein the shape of the internal cavity of each of the plurality of rotor blades is determined by CT scanning or ultrasonic CMM inspection.

7. A method according to claim 1, wherein the internal cavity of each of the plurality of rotor blades is filled with a vibration damping material.

8. A method according to claim 7, wherein the vibration damping material is a viscoelastic damping material.

* * * * *